Oct. 8, 1946.　　　　A. A. BURRY　　　2,408,911
PLASTIC MOLDING MACHINE
Filed Nov. 11, 1943　　　5 Sheets-Sheet 3
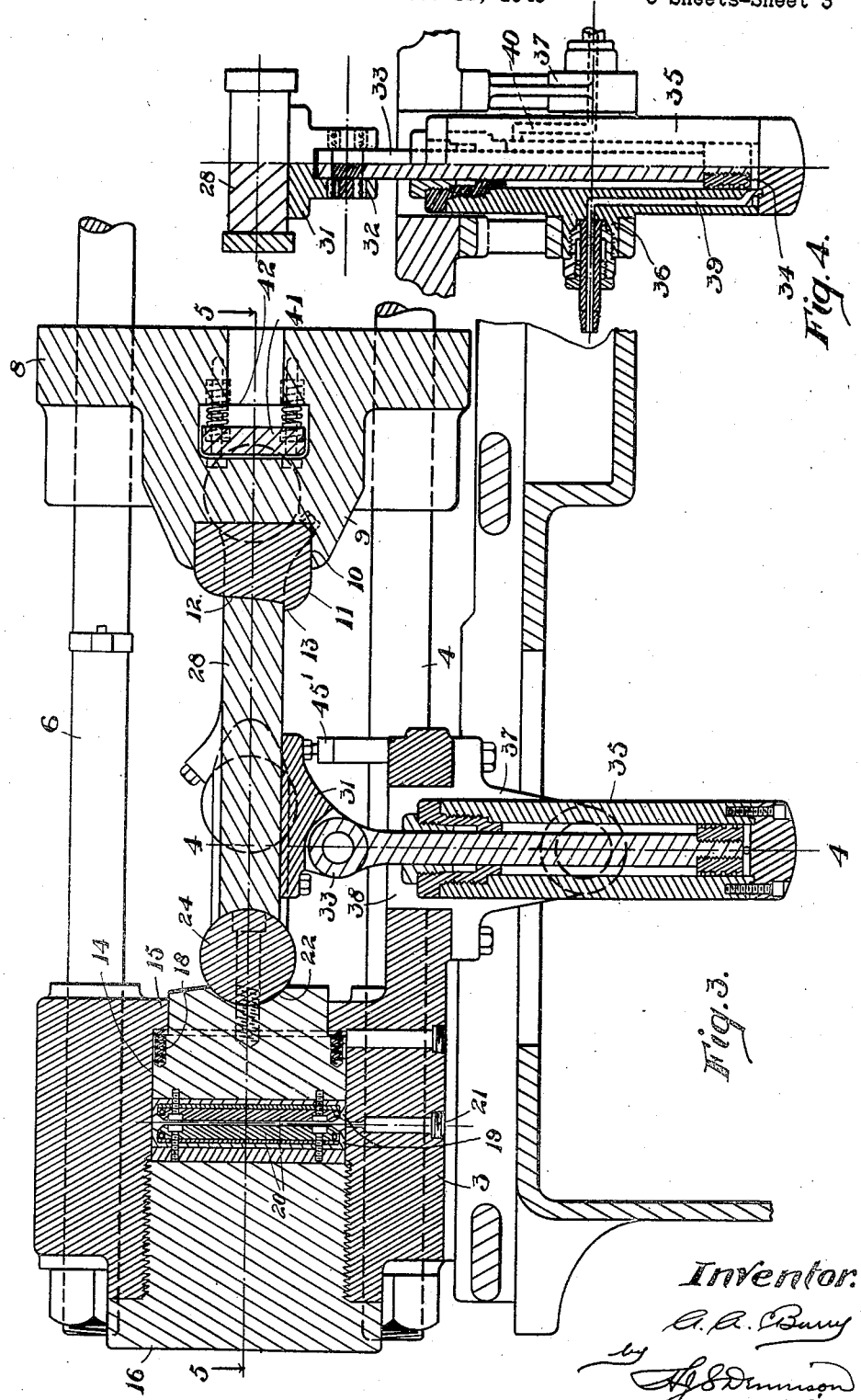
Inventor:
A. A. Burry
by H. J. S. Dennison
atty.

Patented Oct. 8, 1946

2,408,911

UNITED STATES PATENT OFFICE 2,408,911

PLASTIC MOLDING MACHINE

Arthur A. Burry, Toronto, Ontario, Canada, assignor to Cyril Fuller

Application November 11, 1943, Serial No. 509,936

5 Claims. (Cl. 18—16)

This invention relates to machines for molding articles from plastic materials under extremely heavy hydraulic pressure and the principal objects of the invention are to provide a machine in which the faces of the molding die blocks will be held in contact during the molding operation under hydraulic pressure, overbalancing the pressure of the plastic injection mechanism so that the articles produced will be perfectly formed and free from fins caused by leakage of the plastic between the mold faces.

A further important object is to devise a mechanism in which the dies will be separated instantaneously following the completion of the injection operation so that the molded articles may be cleared from the dies with great rapidity and before the material has become chilled.

A still further object is to devise a machine in which the stresses are uniformly distributed between the several moving elements, thereby relieving excess stresses at any particular point in the structure.

One of the principal features of the invention consists in the novel construction and arrangement of a locking toggle between a movable die holder and a fixed abutment whereby the die holder may be operated to close the die carried thereby against the opposing die and to be moved away from same with a rapid reciprocating movement free from endwise pressure, a hydraulically operated member being interposed between the said toggle and the fixed abutment to apply a final closing pressure between the dies.

A further feature of importance consists in the novel construction and arrangement of hydraulic means for breaking the toggle and moving the dies apart and for returning the movable die holder and toggle into closed position.

A still further feature of importance consists in the flexible coupling of the stationary die holder with the cylinder of the injection ram whereby hydraulic pressure is applied to pull the cylinder into operative contact with the stationary die in opposition to the pressure exerted by the injection plunger.

In the accompanying drawings:

Figure 3 is an enlarged vertical longitudinal mid-sectional view of the abutment end of the machine and the movable die holder and toggle mechanism taken on the line 3—3 of Figure 1.

Figure 4 is a part vertical elevation and half section taken on the line 4—4 of Figure 3 of the toggle operating mechanism.

Figure 1:
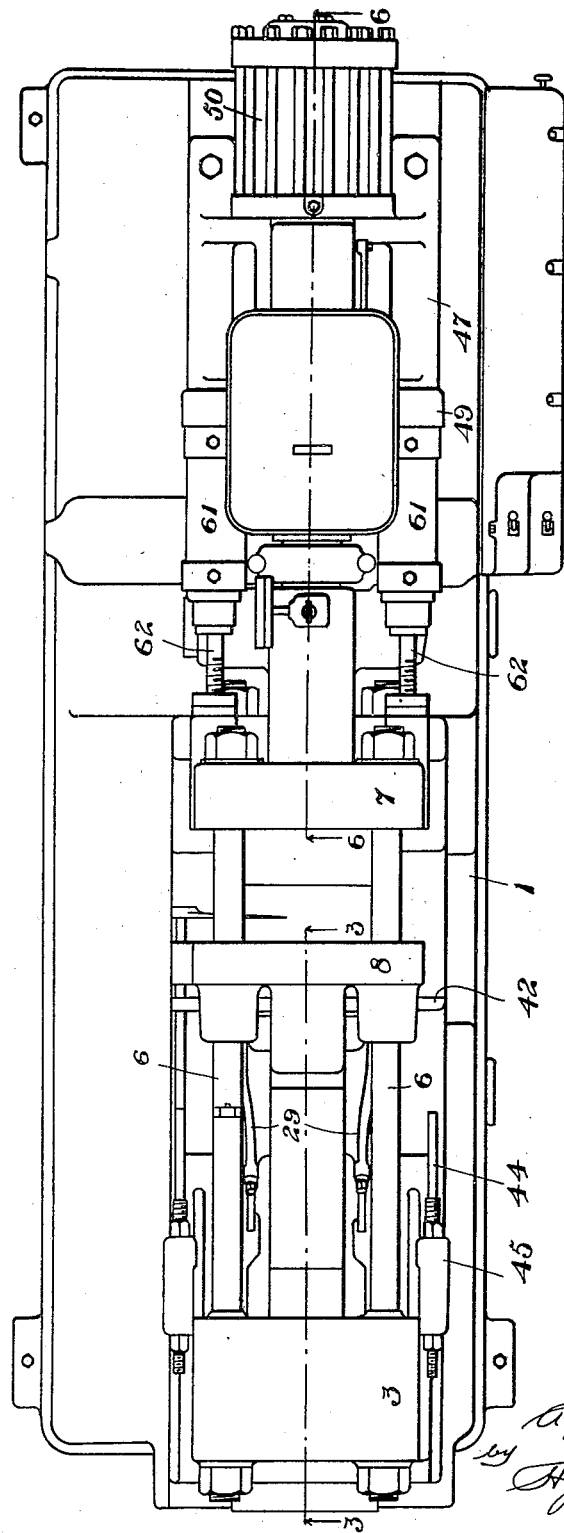
Figure 1 is a plan view of my improved molding machine.
Figure 2:
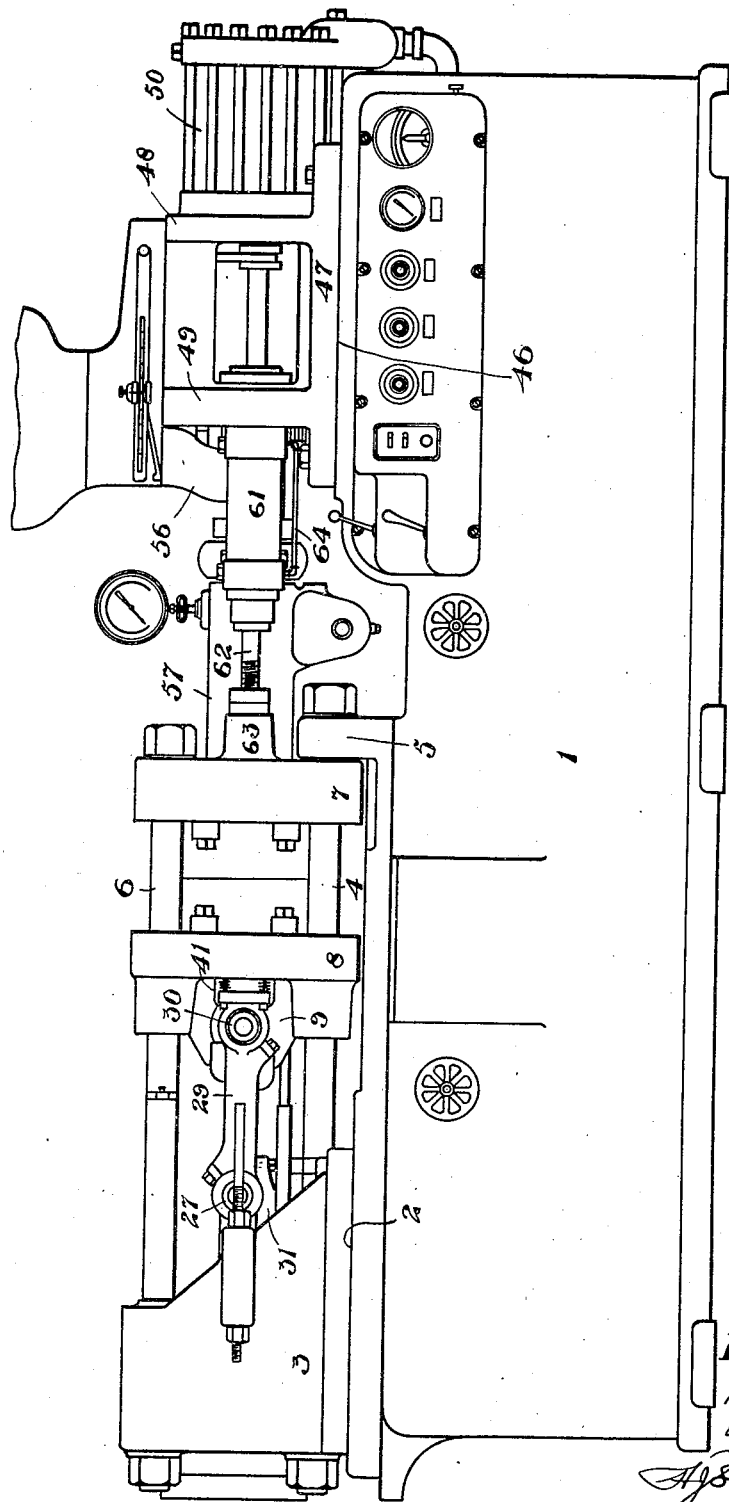
Figure 2 is a side elevational view of the machine.

The machine herein shown and described comprises a base 1 having a horizontal bed plate 2 at one end thereof on which is rigidly mounted an abutment 3 through which extends a pair of horizontal tie rods 4, the inner ends of which are anchored in a flange 5 extending transversely of the base intermediate of its length.

A pair of horizontal tie rods 6 arranged above the rods 4 and parallel therewith are secured at one end in the abutment 3 and the inner ends extend through a die block holder 7 which is slidably mounted on the tie rods 4 adjacent to the flange 5.

A die block holder 8 is slidably mounted on the tie rods 4 and 6 between the member 7 and the abutment 3. The holder 8 is formed with a centrally arranged lug projection 9 which is provided with a transverse horizontal slot 10 in which is mounted a hardened steel block 11 which has an upwardly bevelled curved face 12 terminating in a bottom lip 13.

The abutment 3 is formed with a cylindrical orifice 14 having an annular shoulder 15 at the inner end, and threaded into the outer end of said orifice is a flanged block 16.

Slidably mounted in the cylinder orifice 14 is a piston block 17 which has a reduced end extending beyond the shoulder 15 and spiral compression springs 18 housed in recesses in the piston engage the shoulder and urge the piston inwardly toward the end block 16.

The inner end of the piston 17 is spaced from the inner end of the block 16 and both the piston and block are provided with flanged washers 19 held in position by centre plates 20 secured by suitable countersunk screws.

A port 21 extends through the base of the abutment 3 midway between the inner ends of the piston 17 and block 16 and is connected to a suitable valve-controlled source of hydraulic pressure supply.

The piston block 17 is formed with a part-cylindrical recess 22 in the end projecting from the cylindrical orifice and in this recess is secured by transverse bolts 23 a cylindrical member 24 which is provided with reduced trunnion ends 25.

Rotatably mounted on the trunnion ends 25 are a pair of side plates 26 which are formed with outwardly extending bearing trunnions 27 arranged intermediate of their length.

A plate 28, preferably of hardened steel, is secured between the side plates 26 with one end snugly abutting the cylindrical member 24 secured to the piston, and the other end thereof is curved to correspond to the curvature of the face 12 of the block 11, said curvature being preferably the arc of a circle, the centre of which is located above the axial centre of the member 24 on which the side plates swing so that the plate 28 will swing up and clear the curved face of the block 11.

Mounted on the trunnions 27 are a pair of links 29 which extend alongside the plates 28 and are pivotally connected to trunnion extensions 30 on the sides of the lug 9 of the die-block holder 8.

The link members 29 pivotally mounted on the side plates 26 form a toggle connecting the piston 17 with the movable die block slidably mounted on the longitudinal tie bars 4 and 6.

The plate 28 mounted on and swinging with the side plates of the toggle when in its lowered position, as illustrated in Figure 3, forms a lock or rigid strut between the piston and the block 8.

The plate 28 has secured to its underside a bracket 31 which is formed with a downward extending jaw, and between the side lugs 32 of the jaw is pivotally mounted a plunger rod 33.

A piston 34 is mounted on the rod 33 and operates within a cylinder 35 arranged in substantially right angular relation to the plate 28, and pivotally mounted intermediate of its length on hollowed gudgeons 36 supported in brackets 37 secured to the underside of the bed plate 2 either side of a slot 38.

One of the hollow gudgeons 36 is connected with a port 39 leading to the bottom end of the cylinder 35, and the other of said gudgeons is connected to a port 40 leading to the top of the cylinder. Suitable tubular connections are provided with each of the gudgeons to conduct hydraulic pressure respectively to the bottom and top of the cylinder and to provide alternately for the exhaust of pressure fluid.

It will be understood that by the application of fluid pressure within the cylinder 35 against the bottom end of the piston 34, the piston and plunger rod 33 are forced upwardly, the pressure fluid exhausting through the port 40.

The upward movement of the rod 33 lifts the plate 28 swinging it on its trunnion bearing supports on the ends of the member 24.

It will be understood that there is no binding pressure between the face 12 of the block 11 and the plate 28 due to the pressure of the springs 18 against the piston, forcing it inwardly toward the end block 16, there being no fluid pressure between the said block 16 and piston.

As the plate 28 is swung upwardly through the raising of the piston 34 the side links 29 exert a longitudinal pull upon the trunnions of the block 8, thereby sliding the block, and the die block carried thereby, toward the abutment, thereby pulling the die block carried by the block 8 away from the die block carried by the block 7, so that the faces of the dies are separated a sufficient distance to allow the articles molded with the dies to be moved clear of the dies.

Figure 5:
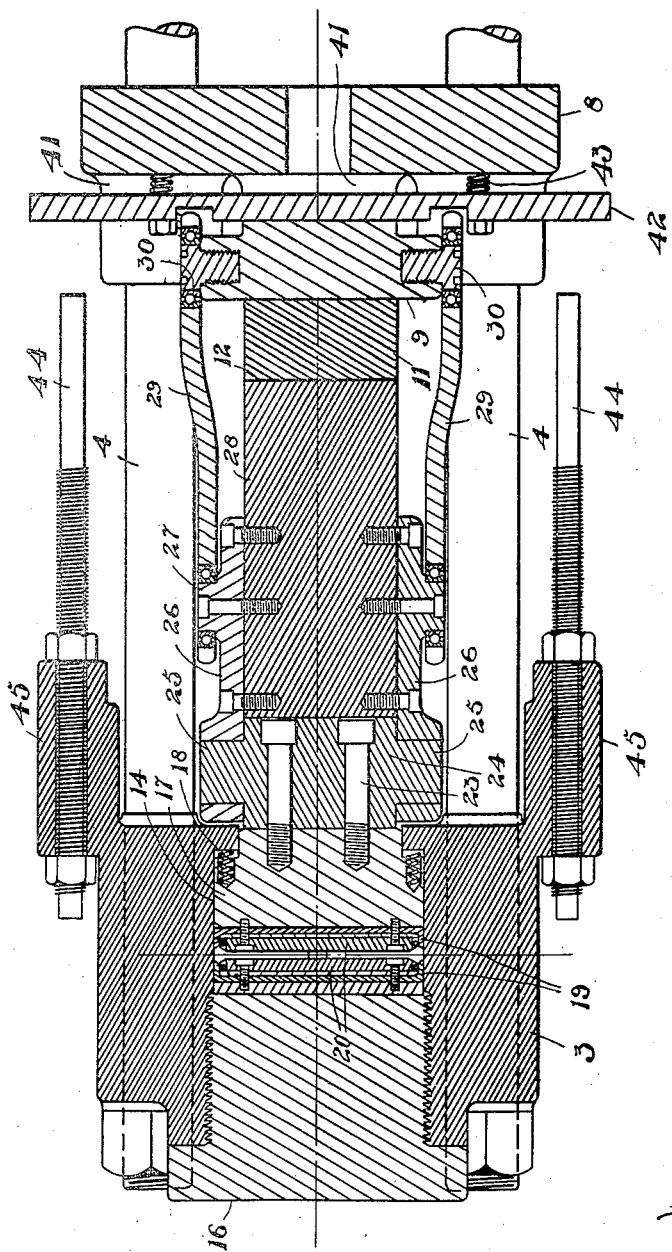
Figure 5 is a horizontal sectional view of the abutment end of the machine taken on the line 5—5 of Figure 3.
Figure 6:
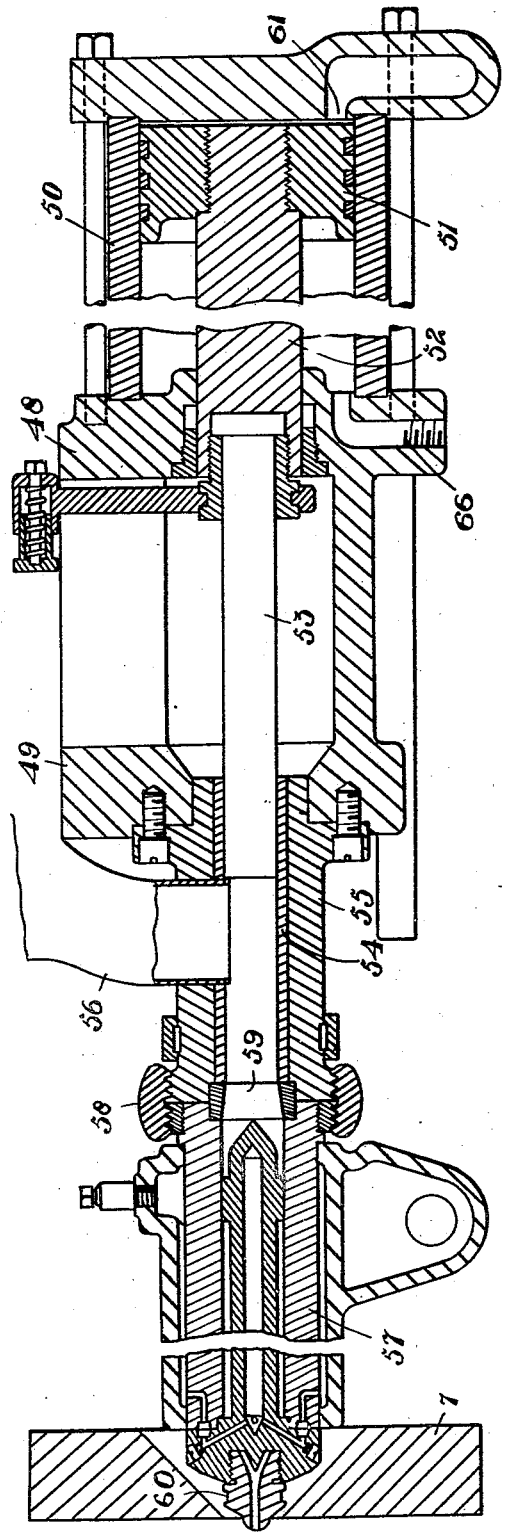
Figure 6 is an enlarged longitudinal sectional view of the injection plunger cylinder and heater taken on the line 6—6 of Figure 1.

The slidable block 8 is provided with a transverse slot 41 in which is mounted a "knock-out" bar 42 which is provided with suitable pins extending through the block 8 to push the molded articles out of the die. The bar 42 is held in the release position by coil compression springs 43. The ends of the bar 42 project beyond the block 8, as illustrated particularly in Figure 5, and are adapted to engage the ends of rod members 44 threaded in lugs 45 extending from the abutment 3.

The threaded rods 44 may be adjusted to any desired position so that the free ends thereof will engage the "knock-out" bar 42 as the block 8 is moved by the upward operation of the toggle, and by the manipulation of a suitable valve mechanism, which may be controlled by the upward swinging of the plate 28 or the longitudinal movement of the die block holder 8, fluid pressure to the cylinder 35 may be reversed, that is to say, the port 39 leading to the bottom of the cylinder will be connected to exhaust and the port 40 will be connected to the pressure side of a suitable hydraulic fluid supply.

Fluid thus enters the top of the cylinder and forces the piston 34 downwardly, thereby swinging the plate 28, and through the toggle, returning the die-holding block 8 to its original position, the plate 28 having its arc-shaped face brought into snug engaging contact with the curved face 12 of the block 11.

This movement of the block 8 brings the die faces into close engagement and through the manipulation of a suitable control switch 45' engaged by the plate 28, or any other part of the toggle mechanism, the valve controlling the inlet of hydraulic pressure fluid to the port 21 is open, and the pressure fluid flowing in between the block 16 and piston 17 applies endwise pressure to the piston which is transmitted along the horizontal centre line through the block 24, the plate 28 and the block 11 to the block 8 carrying the die, thus applying hydraulic pressure to force the contact faces of the dies together with a pressure that will prevent leakage of the plastic material which will then be forced into the die.

The die-holding block 7, which is mounted on the lower tie rod 4, engages the flange 5 to resist the endwise pressure exerted thereagainst by the hydraulic fluid directed against the piston 17. The upper side of the block 7 also engages the limiting nut of the upper tie rods 6.

The base 1 is provided with a bed plate 46 on which is mounted, for limited endwise displacement, a frame 47 which has longitudinally spaced vertical flanges 48 and 49. A cylinder 50 is secured to the outward face of the flange 48 and operating in said cylinder is a piston 51, the plunger 52 of which extends through a suitable packing box in the flange 48.

A ram 53 is secured in the end of the plunger and extends through an orifice in the flange 49 and slidably engages a tubular liner 54 mounted in a cylindrical flanged spacing member 55 secured to the flange 49.

A chute 56, extending from a suitable hopper containing the powdered plastic material, enters the spacer and liner intermediate of its length and feeds the material into the liner in front of the ram 53.

A cylinder 57, surrounded by a heating member 58, is coupled to the end of the cylindrical spacer member 55 by a grooved clamping ring 58, a bushing 59 being interposed between the end of the liner 54 and the cylinder.

The construction of the heater cylinder 57 does not form part of this invention but the surrounding heater provides a temperature which serves to plasticize the material forced through the bore thereof by the operation of the ram 53, and the more-or-less fluid plasticized material flows through the central opening of a nozzle 60 which is bedded into sealing contact with a recess in the die mounted on the block 7.

It will be noted that the hydraulic pressure applied to the outward end of the piston 51 through the port 61 in the end flange of the cylinder 50, is directly opposed to the hydraulic pressure applied to the die block through the piston 17 arranged in the abutment 3.

The operation of the plunger piston for injecting the plastic material into the mold will be controlled by suitable switches to follow immediately after the application of pressure to the dies through the piston 17.

With the endwise pressure exerted against the plastic by the plunger it has the tendency to force the cylinder, the spacer member and the heating cylinder 57 away from its contact with the die blocks, and in order to obviate this and the consequent leakage of the plastic around the nozzle end of the injection cylinder, I provide a pair of hydraulic cylinders 61 arranged at either side of the spacer member and connected to the flange 49 of the frame 47.

The plungers 62 of these cylinders 61 are connected to lugs 63 formed at either side of the block 7.

Hydraulic pressure is directed into the ends of the cylinders 61 closest to the block 7 through conduits 64, and the pressure directed thereinto operates against pistons carried by said plungers within the cylinders 61 to create a direct pull upon the plungers 62 and the block 7, holding the block 7 and its die in close engaging contact with the end of the heater cylinder nozzle.

Suitable switches and levers are arranged in a panel 65 on the side of the base 1 to effect the necessary control for starting and stopping, and suitable valves and other devices are arranged within the base 1 for controlling the time period of movement of the different elements.

A machine constructed as described is found to be extremely efficient in operation.

A very high pressure is exerted by the main injection plunger 53 and this pressure is expended in one direction centrally against the die blocks but the pressure in the cylinder tends to force the cylinder and the injection nozzle away from the die blocks. This tendency is overcome by an opposing pull exerted by the plungers in the cylinders 61 which are attached to the frame carrying the main cylinder and their plungers are connected to the block 7 as described. Thus a pull is exerted in one direction on the block 7 to counteract the pressure against the block exerted through the injection plunger.

This equalization of pressures eliminates the necessity of fine adjustment in the setting of the main plunger cylinder and its connected parts and also avoids the necessity of providing extremely heavy main frame structures.

The pressure applied to the meeting die blocks through the operation of the piston 17 arranged in the abutment 3 is transmitted from the abutment 3 to the flange 5 and substantial equalization occurs through the pull in the opposite direction exerted upon the block 7 by the plungers in the cylinders 61.

The arrangement of toggle mechanisms herein described is extremely important. As the toggle operates freely through the manipulation of the vertical plunger 33 in the cylinder 35 the bearings and joints are not operated under pressure, but after the toggle has been closed pressure is applied hydraulically by the introduction of the hydraulic fluid through the port 21 to force the piston 17 and its connected parts to apply the pressure directly through the locked toggle to the die block.

It will be noted that the cylinder 35 is mounted on horizontal pivots so that the cylinder swings freely in a vertical plane in raising and lowering the toggle.

It will be readily understood that contact making and breaking devices may be arranged at various parts of this mechanism to operate relays for the control of suitable time-controlled valves so that the sequence of operation will follow in the proper order and with the proper timing.

Assuming that the desired dies are properly secured in position on the die holders 7 and 8 and the dies have been brought together face-to-face, the plate 28 will be in a horizontal position, as indicated in Figure 3, and by the operation of a valve hydraulic pressure is admitted through the port 21 to apply pressure back of the piston 17 and thereby force the die blocks together.

Immediately following the application of this hydraulic pressure against the dies a suitable controlled valve is opened to admit hydraulic pressure through the ports 61 to the cylinder 50. A quantity of plastic material will have been deposited in front of the plunger 53 through the hopper chute 56, and the movement of the plunger forces the charge of plastic material longitudinally into the cylinder 57 of the heater, forcing a charge of the plastic material previously fed into the heater out through the nozzle 60 to fill the die cavities.

Hydraulic pressure is constantly applied to the cylinders 61 so that the die block carried by the holder 7 will be held tightly against the nozzle 60 to prevent leakage of the plastic material.

At the completion of the stroke of the piston 51 and its plunger 53 suitable valves will be automatically operated to connect the ports 66 at the inner end of the cylinder 50 with the hydraulic pressure supply and to open the port 61 to exhaust, thereby reversing the travel of the piston 51 and the plunger 53.

Following the operation of the valve to effect the return movement of the plunger 53 the valve controlling the pressure through the port 21 against the piston 17 will be closed and the pressure allowed to exhaust.

Immediately following the release of pressure against the piston 17 hydraulic pressure is directed through the port 39 to the bottom end of the cylinder 35 to force the piston 34 therein in an upward direction, operating the hinged plunger 33 to swing the plate 28 upwardly, and simultaneously operate the toggle links 29 to pull upon the block 8, sliding it on the longitudinal tie rods and separating the die blocks.

The movement of the block 8 effected by the operation of the toggle brings the "knock-out" bar 42 into contact with the adjustable rods 44, and the movement of the bar 42 is arrested while the block 8 continues to move, thereby forcing suitable "knock-out" pins connected to the bar 42 or engaged thereby to push the molded articles out of the die cavities from where they will fall into a suitable receptacle.

Upon the completion of the upward stroke of the plunger 33 and the operation of the toggle and the block 8 the flow of pressure fluid through the port 39 is closed and the port is open to exhaust, while simultaneously the port 40 leading to the top of the cylinder is open to the inlet of a pressure fluid and the plunger 33 is moved downwardly, thereby swinging the plate 28 and the toggle links downwardly so that the block 8 is moved horizontally to bring the dies carried thereby back into face contact with the dies carried by the block 7.

In the meantime the flow of pressure fluid to the plunger cylinder 50 has been automatically discontinued on the completion of the return stroke of the plunger, and when the plate 28 has been swung downwardly into contact with the face 12 of the block 11 the pressure is again automatically applied to the piston 17 while pressure is discontinued through the port 40 to the plunger 33.

It will be readily appreciated that numerous forms of control devices in the form of relays, switches and valves may be utilized to accomplish the sequence of operations of the various elements of this machine, as has been herein described.

In the operation of a machine such as described it is sometimes found necessary to clear the injection nozzle of plastic material which may flow therefrom during the periods when the pressure may be relieved and in order to accomplish this result the hydraulic pressure to the cylinders 61 may be reversed so that the plungers will be forced outwardly to move the die holder 7 in the direction of the die holder 8, while the toggle is raised, thereby moving the block 7 and its die clear of the injection nozzle 6 and permitting access thereto for cleaning or repair.

What I claim as my invention is:

1. In a plastic molding machine, the combination with a pair of separable dies, of toggle links connected with one of said dies to move same toward and from the other of said dies, a strut plate separate from said toggle links adapted to be moved without compressive pressure to engage and lock the toggle operated die, hydraulic means arranged in angular relation to said strut plate to move same into and out of locking position, and hydraulic means for applying compressive pressure directly to said strut plate and die following the completion of the closing movement of said strut plate and toggle links.

2. In a plastic molding machine, the combination with a pair of separable dies, of toggle links pivotally connected to one of said dies, an abutment arranged in opposed relation to the latter die, a hydraulically operated member mounted in said abutment, toggle links pivotally connected to said hydraulically operated member and pivotally connected to the aforesaid toggle links a rigid strut plate carried by the toggle link connected to the hydraulically operated member arranged to engage in locking contact free from endwise pressure between the die connected to said toggle and said hydraulically operated member to form a rigid strut therebetween, and hydraulic means pivotally connected to and extending substantially right angularly from said strut plate for raising and lowering said toggle to move the toggle-connected die from and to the mating die.

3. In a machine as claimed in claim 2, a hydraulic cylinder mounted on horizontal pivots to swing in a vertical plane having hollow trunnion pivot supports, a port leading from one of said hollow trunnions to the bottom end of said cylinder, a port leading from the other of said trunnions to the top of said cylinder, and a plunger mounted in said cylinder and pivotally connected at its upper end with the locking strut plate pivotally connected with the hydraulically operated member in said abutment.

4. A plastic molding machine comprising a base, an abutment mounted at one end of said base, a flange rigid with said base spaced from said abutment, horizontal tie rods extending from said abutment to said flange, a die block holder mounted on said tie rods adjacent to said flange, a die block holder slidably mounted on said tie rods between the aforesaid holder and said abutment, a horizontally movable hydraulically operated member mounted in said abutment, toggle links connecting said hydraulically operated member with said slidable die block holder, a rigid member extending from the toggle member connected to said hydraulically operated member and adapted to engage in locking contact with said slidable die block holder to form a rigid strut therebetween, and means for operating said rigid locking member to first clear the rigid member from locking contact with the die block holder, then moving said die block holder longitudinally on said tie rod, and then returning the die block holder and locking same prior to the application of compression pressure by said hydraulically operated member.

5. A plastic molding injection machine, comprising a base, an injection cylinder plunger and a heating cylinder connected therewith mounted on said base, a die holder movably mounted on said base, a pair of hydraulic cylinders mounted upon and arranged one at either side of said injection cylinder, plungers mounted in said pair of hydraulic cylinders rigidly connected to said movable die holder, means for directing hydraulic fluid pressure into said pair of cylinders to operate said plungers to exert a pulling force between said injection cylinder and said die block in opposition to the pressure exerted against the die block by the ram of the injection cylinder, a die block movably mounted to and from engagement with the aforesaid die block, means for moving the latter die block to and from engagement with the aforesaid die block, and means for exerting hydraulic pressure against said movable die block in opposition to the pressure exerted thereagainst by the operation of the injection plunger.

ARTHUR A. BURRY.